(12) United States Patent
Micheron et al.

(10) Patent No.: US 6,531,699 B1
(45) Date of Patent: Mar. 11, 2003

(54) HEAT DETECTOR WITH A LIMITED ANGLE OF VISION

(75) Inventors: François Micheron, Gif S/Yvette (FR); Marie-Benoîte E. Jolliot, Gif S/Yvette (FR); Gérard Berginc, Thiais (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/774,184

(22) PCT Filed: May 19, 2000

(86) PCT No.: PCT/FR00/01377

§ 371 (c)(1),
(2), (4) Date: Feb. 5, 2001

(87) PCT Pub. No.: WO00/75615

PCT Pub. Date: Dec. 14, 2000

(30) Foreign Application Priority Data

Jun. 4, 1999 (FR) .............................. 99 07105

(51) Int. Cl.[7] .................................. G01J 5/08
(52) U.S. Cl. ....................................... 250/332
(58) Field of Search ...................... 250/332, 338.1, 250/353

(56) References Cited

U.S. PATENT DOCUMENTS

| | | |
|---|---|---|
| 4,431,918 A | 2/1984 | White ................. 250/338.1 |
| 4,782,227 A | 11/1988 | Micheron et al. ........... 250/580 |
| 5,020,910 A * | 6/1991 | Dunn et al. ................ 356/328 |
| 5,286,976 A * | 2/1994 | Cole ........................... 250/349 |
| 5,293,036 A * | 3/1994 | Norton ................... 250/208.1 |
| 5,554,849 A * | 9/1996 | Gates .................... 250/370.08 |
| 5,640,013 A * | 6/1997 | Ishikawa et al. ......... 250/338.4 |
| 5,754,341 A * | 5/1998 | Takata et al. .............. 359/569 |

FOREIGN PATENT DOCUMENTS

| | | |
|---|---|---|
| JP | 58-167928 | 10/1983 |
| JP | 61-205827 | 9/1986 |

* cited by examiner

*Primary Examiner*—Constantine Hannaher
*Assistant Examiner*—Shun Lee
(74) *Attorney, Agent, or Firm*—Oblon, Spivak, McClelland, Maier & Neustadt, P.C.

(57) ABSTRACT

An uncooled thermal matrix detector having a given spectral sensitivity range and being formed from pixels which are thermally insulated from each other, each pixel including an absorbing element which is thermosensitive in the spectral sensitivity range. The thermal matrix detector also includes on its face, turned toward the incident radiation to be detected, of each thermosensitive absorbing element, a biperiodic grating of elementary blocks limiting the viewing angle of the detector, the pitch of the grating being less than the mean wavelength of the spectral sensitivity range. The thermal matrix detector can be applied to so-called BLIP uncooled thermal detectors.

10 Claims, 4 Drawing Sheets

HEAT DETECTOR WITH A LIMITED ANGLE OF VISION

BACKGROUND OF THE INVENTION

1. Field of the Invention

The invention relates to the field of thermal detectors, especially so-called BLIP (background limited performance) high performance thermal detectors. These thermal detectors have a sensitivity which is theoretically limited by the thermal conductivity noise between the detector and the external environment. This noise arises from the fluctuation in the number of photons coming from the external environment and arriving on the surface of the thermal detector.

2. Discussion of the Background

Thermal detectors are detectors which measure, directly or indirectly, the heat produced by the incident radiation to be detected when it arrives on the surface of the detector, which heat is transformed into a temperature rise at the detector surface. Preferably, the spectral sensitivity range of the thermal detectors is situated in the infrared.

Generally, the scene observed by a thermal detector is "seen" by the latter under a certain viewing angle called viewing angle of the scene. When the thermal detector is part of an optical architecture, the viewing angle of the scene is determined by the aperture of the entrance optics of the optical architecture. In order to limit the noise received by the thermal detector, it is beneficial to limit the viewing angle of the thermal detector to a given angle, preferably equal to the viewing angle of the scene. Thus, without loss of signal, the noise received by the thermal detector will be decreased.

Thermal detectors are subdivided into two families, cooled thermal detectors and uncooled thermal detectors. A cooled thermal detector generally comprises a cold shield. This cold shield is pierced by an aperture which limits the viewing angle of the detector to the viewing angle of the scene. This is because, the cold shield is at low temperature, typically about 77 kelvin. Thus the thermal emission of the cold shield is negligible compared to the thermal emission of the observed scene since the latter is much hotter, typically 300 kelvin. The cold shield provides a marked improvement in the performance of a thermal detector by limiting its viewing angle. Similarly, the aperture of the cold shield may contain a spectral filter cooled like the cold shield. Thus, the spectral sensitivity range of the thermal detector may be reduced to certain windows corresponding advantageously to the windows of atmospheric transparency.

Since the uncooled thermal detectors do not have a cold shield, this solution is difficult to apply without also cooling the detectors, which would decrease their advantage. Consequently, the invention is applicable most particularly to uncooled detectors.

According to the prior art, several types of uncooled thermal detectors have been proposed. The majority of them are detectors with microbolometers, i.e. matrix detectors, the pixels of which are made of a material whose resistance varies according to the temperature. The pixels have one or more layers depending on the type of thermal detector. However, one property common to these different types of pixel is that of having an absorbent layer which absorbs the majority of the incident radiation even when the latter has an almost horizontal incidence, i.e. making a large angle with the normal to the detector surface.

SUMMARY OF THE INVENTION

The invention makes it possible, as in the case of cooled thermal detectors, to limit the viewing angle of the detector, preferably to the viewing angle of the scene. For this, each pixel is individually provided with a biperiodic structure, the pitch of which is smaller than the mean wavelength of the spectral sensitivity range of the detector and which has the effect of limiting the viewing angle of the thermal detector. This limitation is obtained by the transition of the pixel from a rather absorbing state to a rather reflecting state depending on the angle made with the normal to the surface of the detector by the incident radiation upon its arrival on the surface of the thermal detector. The choice of parameters for this biperiodic structure makes it possible to limit the viewing angle of the detector to the value required by the particular application envisaged. This biperiodic structure is a biperiodic grating of elementary blocks, the angular selectivity of which is high enough to allow the usual conditions of the envisaged applications to be satisfied.

According to the invention, an uncooled thermal matrix detector is provided having a given spectral sensitivity range and being formed of pixels which are thermally insulated from each other, each pixel comprising an absorbent element which is thermosensitive in the spectral sensitivity range, characterized in that on the face, turned toward the incident radiation to be detected, of each thermosensitive absorbing element is placed a biperiodic grating of elementary blocks limiting the viewing angle of the detector, and in that the pitch of the grating is less than the mean wavelength of the spectral sensitivity range.

BRIEF DESCRIPTION OF THE DRAWINGS

The invention will be n and other particular features and advantages will appear with the help of the description below and of the appended drawings, given by way of examples, where.

DESCRIPTION OF THE PREFERRED EMBODIMENTS

Figure 1:
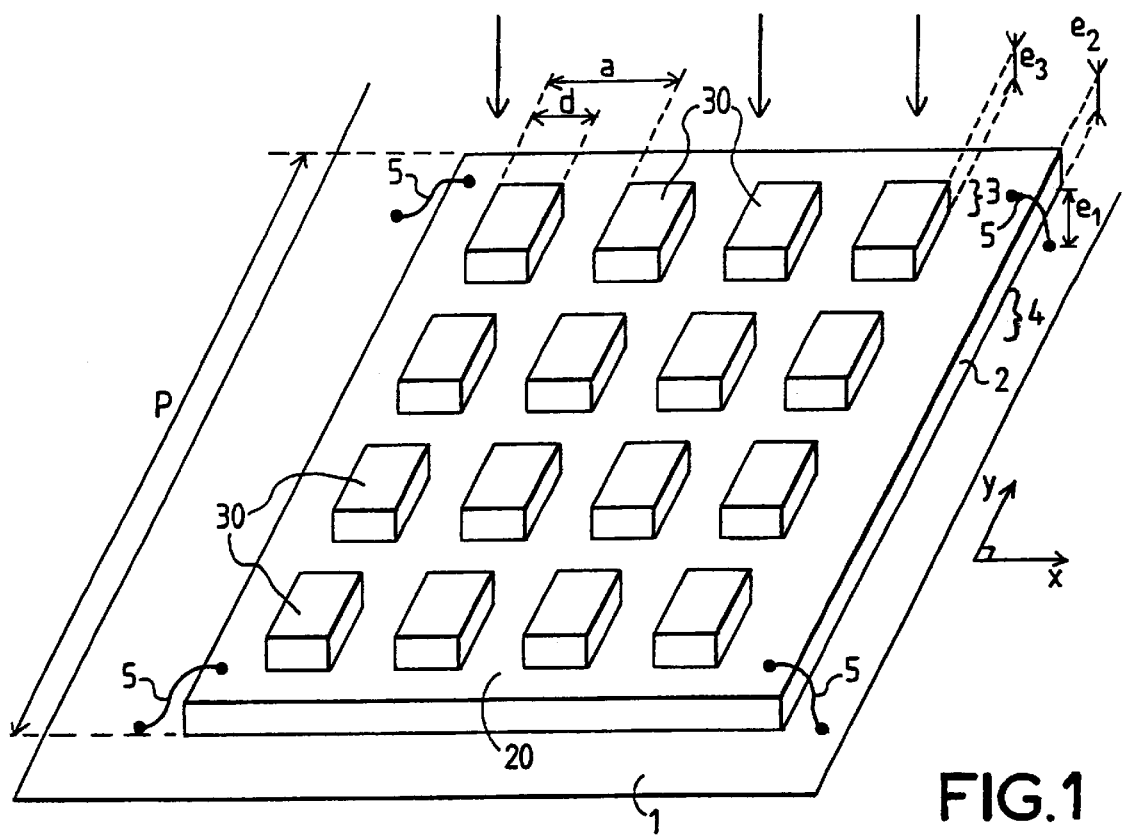
FIG. 1 shows schematically the structure of a particular type of pixel of which the thermal detector according to the invention is formed.

FIG. 1 shows schematically the structure of one particular type of pixel of which the thermal detector according to the invention is made. The thermal detector according to the invention is a matrix detector, i.e. it is in the form of a two-dimensional matrix of individual pixels. One of these pixels is shown in FIG. 1. The pixel is shown in perspective. The pixel is illuminated by incident radiation coming from the external environment and in particular from the scene to be observed. This radiation may be divided, on the one hand, into incident radiation to be detected which is the useful signal represented by solid arrows and, on the other hand, into undesirable radiation which is noise. The pixel comprises an absorbent element 2 which is thermosensitive in the spectral sensitivity range of the thermal detector, i.e. an element of which at least one measurable property varies according to its temperature. The thermosensitive absorbent element 2 is preferably flat. It is, for example, a square of side p. The thermosensitive absorbing element 2 may comprise, depending on the technologies used, one or more layers of material, some of which may then be absorbing, others thermosensitive, yet others insulating, while some possess many of these properties at the same time. Preferably, this thermosensitive absorbing element 2 comprises a microbolometer, which may or may not be coated with an additional absorbing layer, the resistance of the element 2 then being dependent on its temperature.

The pixel also comprises elementary blocks 30. The elementary blocks 30 are placed on one 20 of the faces of the thermosensitive absorbing element 2. The face 20 of the element 2 bearing the elementary blocks 30 is the face 20 turned toward the incident radiation to be detected, represented by the solid arrows. The general direction of the incident radiation to be detected is generally substantially along the normal to the surface of the thermosensitive absorbing element 2. By choosing the mean propagation direction of the incident radiation to be detected as the high to low direction, the elementary blocks 30 are located above the thermosensitive absorbing element 2. The set of these elementary blocks 30 forms a grating 3, the elementary blocks 30 of which form the patterns. The grating 3 may, for example, be deposited or even etched on the thermosensitive absorbing element 2. The grating 3 is biperiodic, i.e. periodic along two directions parallel to the surface of the thermosensitive absorbing element 2. The periodicities along the two axes X and Y are advantageously equal. These two directions are preferably perpendicular, they are shown by the X and Y axes. The mean direction of the incident radiation to be detected is generally perpendicular to the plane formed by the X and Y axes.

Preferably, the pixel comprises, below the thermosensitive absorbing element 2 of thickness $e_2$, a substrate 1 reflecting in the spectral sensitivity range of the thermal detector. The pixel thus comprises an electrically and thermally insulating layer 4 which is advantageously formed by a vacuum or even by air. The substrate 1 is preferably common to all the pixels, but the pixels remain, even so, thermally insulated from each other by the presence of the electrically and thermally insulating layer 4. The pixel preferably comprises electrical connection leads 5, in general, two or even four as in FIG. 1, which allow the direct or indirect reading of the property which is variable according to the temperature of the thermosensitive absorbing element 2. The thermal conductivity of these connection leads 5 must be as low as possible, at least less than a given threshold which depends on the envisaged application. In the preferred embodiment envisaged below where the layer 4 is formed by a vacuum, the thermosensitive absorbing element 2 is in the form of a microbridge, with one or more layers, suspended above the reflecting substrate 1 using several electrical connection leads 5.

To facilitate the absorption phenomenon, which occurs in the thermosensitive absorbing element 2, the thickness $e_1$ of the vacuum layer 4 is preferably chosen so that, on one hand, an electrical field node is situated at about the reflecting substrate 1 and, on the other hand, an electrical field antinode is situated in the thickness $e_2$ of the thermosensitive absorbing element 2. The sum of the thickness $e_1$ of the electrically and thermally insulating layer 4, which is a vacuum here, and of the half thickness $e_2/2$ of the thermosensitive absorbing element 2 is almost equal to a quarter of the mean wavelength $\lambda_0$ of the spectral sensitivity range of the thermal detector. Thus the absorption effect in the thermosensitive absorbing element 2 is maximum.

The biperiodic grating 3 of elementary blocks 30 has a pitch a and a length d of elementary block. The grating 3 of elementary blocks 30 act as a spatially resonating element which limits the viewing angle of the detector to a value which is advantageously equal to the viewing angle of the scene to be observed. The pitch a of the grating plays an important role in this property, the pitch a must be less than the mean wavelength $\lambda_0$ of the spectral sensitivity range of the detector. Examples of values of the pitch a will be given in FIG. 3. It will be noticed that the smaller the ratio $a/\lambda_0$, the smaller the value of the viewing angle of the detector.

The grating 3 has a thickness $e_3$. This value must be high enough so that the grating 3 has this angular selectivity effect. Preferably, the grating 3 is thick, i.e. the grating 3 has a thickness $e_3$ which is greater than a tenth of the mean wavelength $\lambda_0$ of the spectral sensitivity range of the detector. Where this thickness $e_3$ is large enough, it makes it possible to better control, via the grating 3, the multiple reflections of the incident radiation which are produced at about the elementary blocks 30 of the grating 3 and which contribute to the value of the overall reflection coefficient of the detector.

The elementary blocks 30 have, for example, a parallelepipedal shape as in FIG. 1, which has the advantage of simplicity. The elementary blocks 30 preferably have a pyramidal shape which further makes it possible to promote absorption by multiple reflections on the elementary blocks 30 of the grating 3. The apex of the pyramidal shape is oriented upward, i.e. toward the incident radiation to be detected. The pyramidal shape also allows better impedance matching between the external environment, generally vacuum or air, and the material forming the thermosensitive absorbing element 2. For reasons of polarization symmetry, the elementary blocks 30 have equal dimensions along the X and Y axes, they are then like squares, when seen from above.

The elementary blocks 30 of the grating 3 are preferably made of an electrically conducting material. The electrical conductivity of the elementary blocks 30 is intermediate between dielectrics and perfect conductors. The application envisaged will make it possible to determine the optimum conductivity of the material forming the elementary blocks 30. The ratio $\epsilon''/\epsilon'$ of the imaginary part to the real part of the electrical permittivity of the material is typically greater than unity. The material is for example of the type such as doped amorphous silicon or even vanadium dioxide. However, other materials used as thermosensitive absorbent in uncooled thermal detectors may be suitable.

Figure 2:
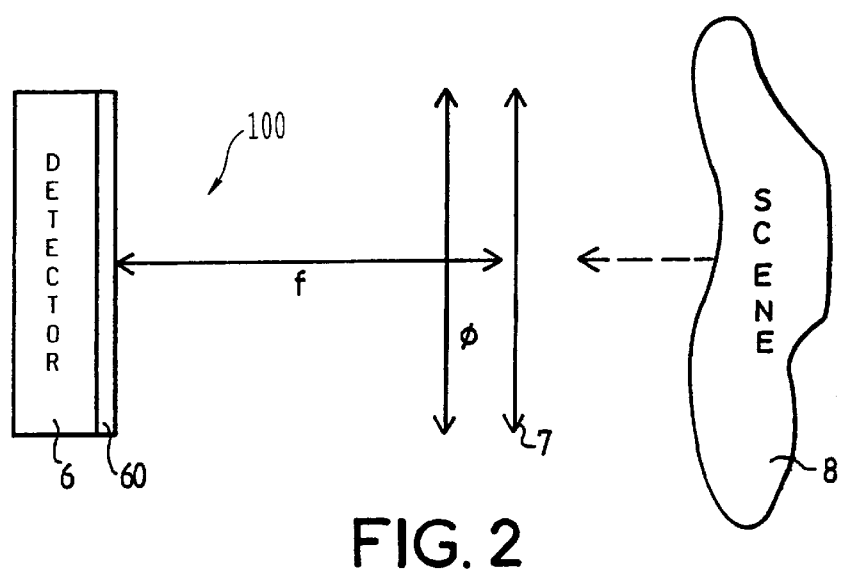
FIG. 2 shows schematically an optical architecture containing a thermal detector according to the invention.

FIG. 2 shows schematically a type of optical architecture containing a thermal detector 6 according to the invention. The surface 60 is the sensitive surface of the detector 6 on which the pixels previously described, are placed. The optical architecture also comprises entrance optics 7 collecting the incident radiation to be detected from a scene 8 to be observed. The general direction of the incident radiation to be detected is represented by an arrow in dotted lines. The entrance optics 7 have an aperture defined by their diameter Φ and by its focal length f. The viewing angle of the scene is equal to 2 arctan (Φ/2f), which is approximately equal to Φ/f for relatively small angles. Thus the viewing angle of the detector will advantageously be limited to a value θ almost equal to 2 arctan (Φ/2f).

The size of each pixel is of the order of a few times the maximum wavelength $\lambda_m$ of the spectral sensitivity range of the detector. Thus, in the majority of usual cases, each pixel will have a surface area which covers at least the Airy disk for the maximum wavelength $\lambda_m$ of the spectral sensitivity range of the detector thus leading to a high signal to noise ratio for the thermal detector considered, since the Airy disk contains the bulk of the incident radiation energy corresponding to a point of the scene. The diameter of this Airy disk corresponds to the product of the aperture of the entrance optics 7 and the maximum wavelength $\lambda_m$, and is thus equal to 2 $\lambda_m$ arctan ($\Phi/2f$).

Figure 3:
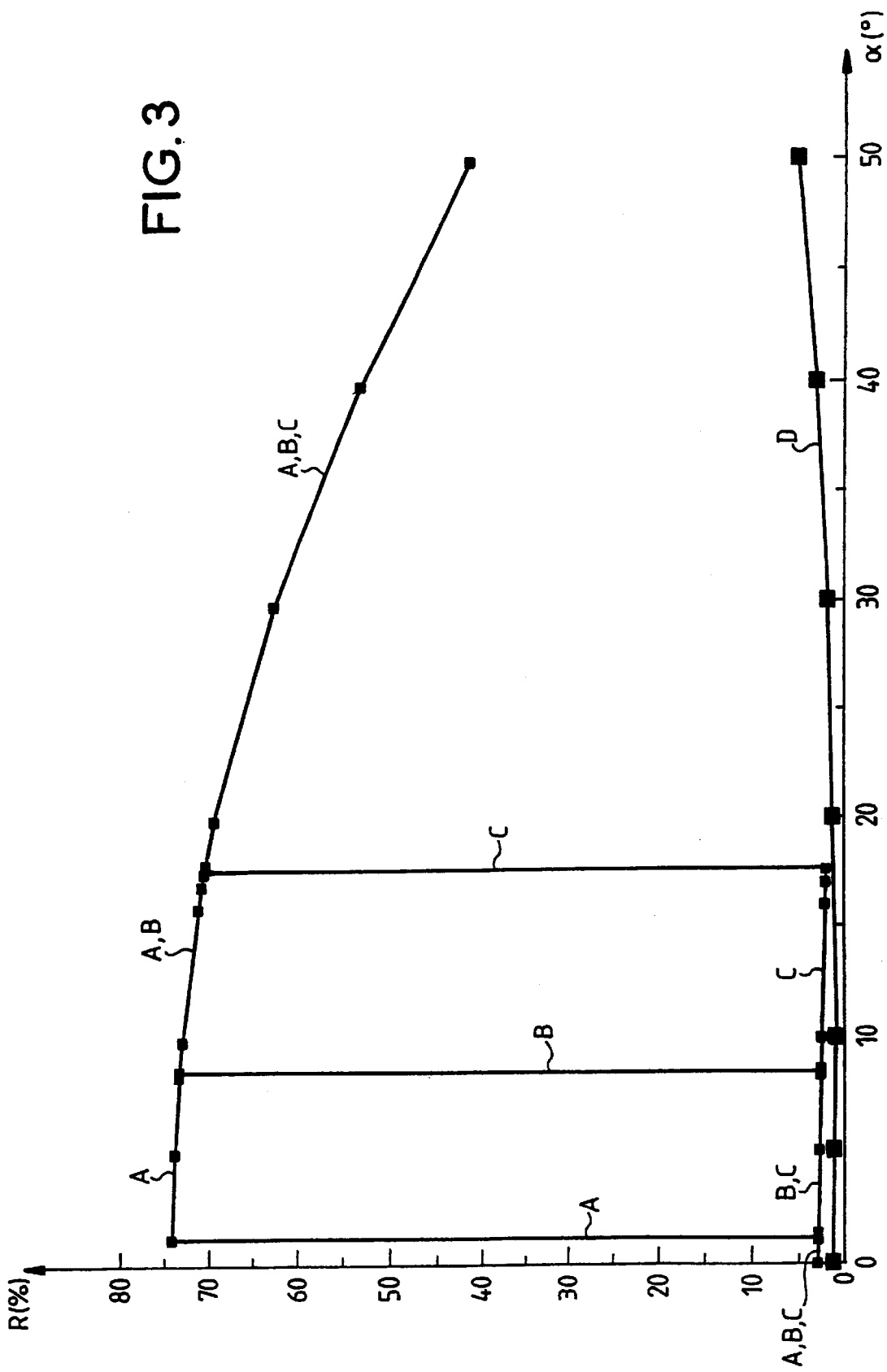
FIG. 3 shows schematically an example demonstrating the effect of the pitch of the grating on the angular selectivity of the grating in a thermal detector according to the invention.

FIG. 3 shows schematically an example demonstrating the effect of the pitch a of the grating 3 on the angular selectivity of the grating 3 in a thermal detector according to the invention. The example corresponds to a thermal matrix detector, the pixels of which are in keeping with that shown in FIG. 1. The spectral sensitivity range is band III in the infrared, the mean wavelength in question being equal to $\lambda_0=10.6\,\mu m$. The thickness of the vacuum layer 4 is equal to $e_1=1.45\,\mu m$ and the thickness of the thermosensitive absorbing element 2 is equal to $e_2=2.3\,\mu m$. Here, the material of the element 2 is doped amorphous silicon, the real and imaginary relative permitivities of which are equal to 1 and 1.68 respectively. The thickness of the grating 3 made of the same material as the thermosensitive absorbing element 2, is equal to $e_3=2\,\mu m$. The ratio d/a for the elementary blocks is taken as equal to 0.9 and the effect of the various values of pitch a of the grating 3 are studied. The size of each pixel, i.e. the side of the square formed by the pixel, are equal to about p=50 $\mu$m. There are therefore about 100 blocks 30 per grating 3. The following values correspond to an ideal case which does not take into consideration the finished nature of the grating 3.

FIG. 3 shows the variation of the overall reflection coefficient R of the thermal detector which comprises a large number of pixels, expressed as a percentage %, according to the angle of incidence a of the incident radiation with respect to the normal to the detector surface, expressed in degrees/°. The curves A, B and C show this variation for values of pitch a of the grating 3 equal to 4.85 $\mu$m, 5 $\mu$m and 5.2 $\mu$m, respectively. The angular limitation thresholds, which are quite abrupt, are equal to 1.5 degrees, 8.5 degrees and 19 degrees, respectively. The angular limitation threshold appears very marked, it corresponds, for the detector, to the transition from a rather absorbing state to a rather reflecting state. For slightly different pitches a of the grating 3, the angular limitation effect appears for substantially different values, the angular selectivity is therefore very sensitive to the pitch a of the grating. Thus the choice of a pitch a of the grating 3 matched to the envisaged application makes it possible to obtain the desired limitation of the viewing angle of the detector corresponding advantageously to the viewing angle of the observed scene. The curve D shows the variation of the overall reflection coefficient of the detector where the grating 3 is absent. It is clear that the detector is then in an absorbing state whatever the angle of incidence of the incident radiation, and that the effect of limiting the viewing angle of the detector is virtually absent. The grating 3 of the blocks 30 and of pitch a less than the mean wavelength $\lambda_0$ of the spectral sensitivity range is at the origin of this effect of limiting the viewing angle of the detector, which is very marked.

Figure 4:
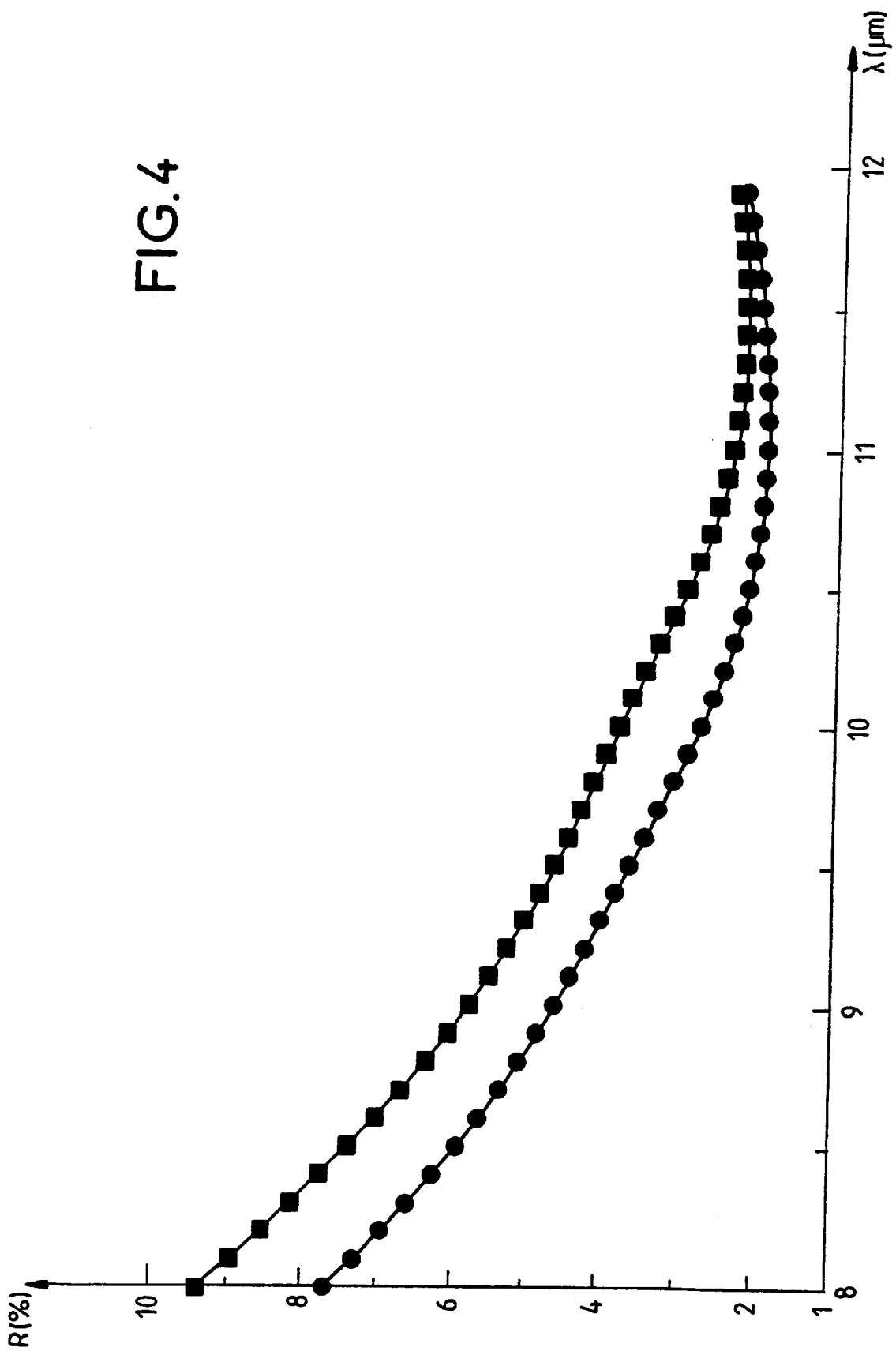
FIG. 4 shows schematically an example demonstrating the spectral selectivity of a thermal detector according to the invention.
Figure 5:
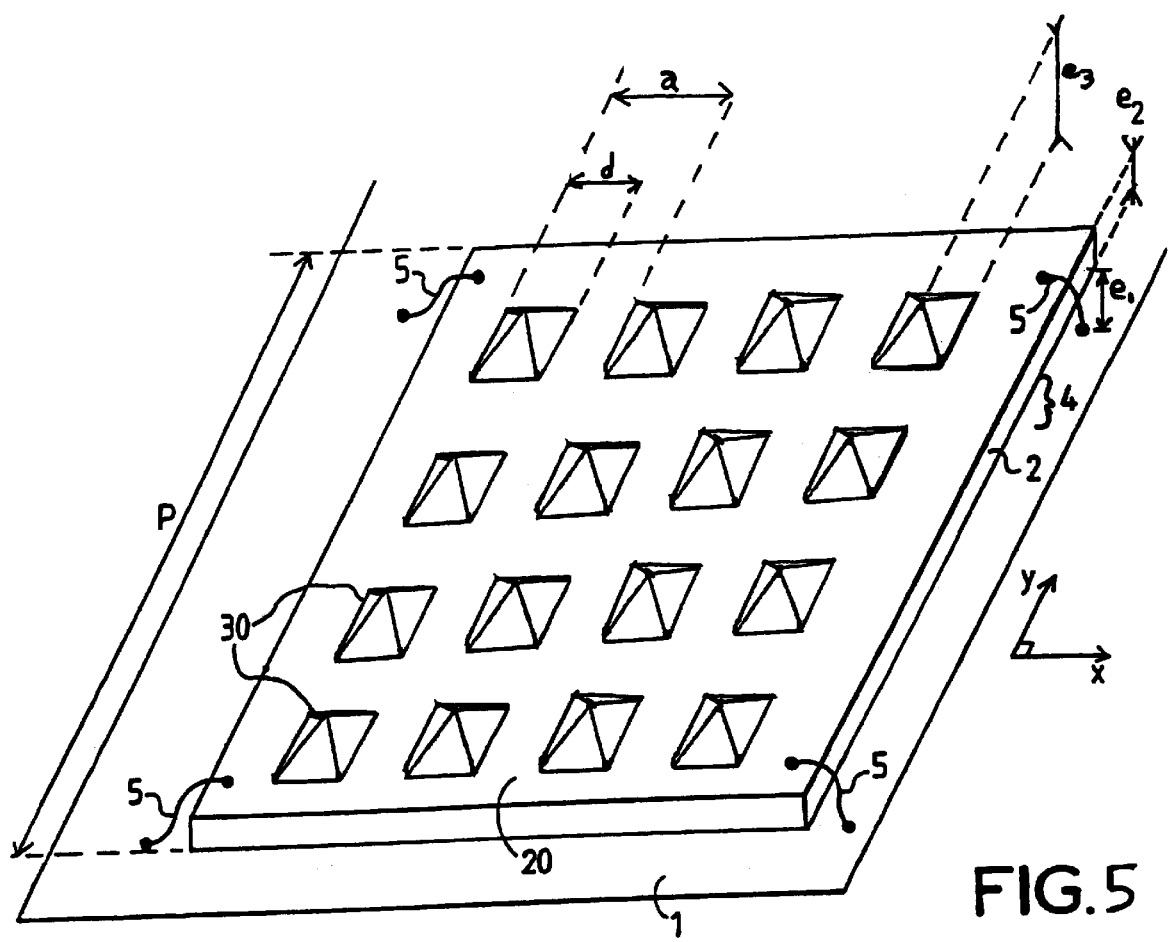

FIG. 4 shows schematically an example demonstrating the spectral selectivity of a thermal detector according to the invention, and it relates to the same example of the detector as that of FIG. 3. FIG. 4 shows the variation in the overall reflection coefficient R, as a percentage %, according to the incident wavelength $\lambda$, expressed in micrometers $\mu$m, each curve corresponding to a different pitch a of the grating 3. Two curves are shown, the curve of squares corresponding to a pitch a equal to 5 $\mu$m and the curve of circles corresponding to a pitch a equal to 5.2 $\mu$m. The angle of incidence of the incident radiation has been taken quite close to the limit of the detector viewing angle for these two curves, at 5 and 15 degrees, respectively. The curves exhibit quite a flat minimum around a wavelength $\lambda$ equal to 11 $\mu$m, however the selective effect is more marked at lower wavelengths $\lambda$, for example, equal to about 8 $\mu$m. A thermal detector according to the invention therefore exhibits a certain spectral selectivity. In certain applications, the latter may be used to further increase the absorption of the thermal detector at certain discrete laser wavelengths corresponding to damaging laser lines. The protection of the thermal detector against laser damage is thus improved.

What is claimed is:

1. An uncooled thermal matrix detector having a given spectral sensitivity range and being formed of pixels which are thermally insulated from each other, each pixel comprising an absorbent element which is thermosensitive in the spectral sensitivity range, characterized in that on the face turned toward the incident radiation to be detected, of each thermosensitive absorbing element is placed a biperiodic grating of elementary blocks limiting the viewing angle of the detector, and in that the pitch of the grating is less than the mean wavelength of the spectral sensitivity range.

2. The detector as claimed in claim 1, characterized in that the size of each pixel is of the order of a few times the maximum wavelength of the spectral sensitivity range.

3. The detector as claimed in claim 1, characterized in that the grating has a thickness which is greater than a tenth of the mean wavelength of the spectral sensitivity range.

4. The detector as claimed in claim 1, characterized in that the elementary blocks of the grating are of pyramidal shape.

5. The detector as claimed in claim 1, characterized in that the elementary blocks of the grating are made of an electrically conducting material of conductivity intermediate between dielectrics and perfect conductors.

6. The detector as claimed in claim 1, characterized in that the thermosensitive absorbing element comprises a layer of a bolometric material.

7. The detector as claimed in claim 1, characterized in that each pixel comprises successively, in the direction of propagation of the incident radiation to be detected, the grating, the thermosensitive absorbing element an electrically and thermally insulating layer, a substrate reflecting in the spectral sensitivity range, and in that the electrically and thermally insulating layer has a thickness such that, on the one hand, at about the reflecting substrate there is an electric field node and, on the other hand, at about the thermosensitive absorbing element there is an electric field antinode.

8. The detector as claimed in claim 7, characterized in that the electrically and thermally insulating layer is formed by a vacuum and in that the thermosensitive absorbing element is in the form of a microbridge connected to the reflecting substrate by electrical connection leads the thermal conductivity of which is less than a given threshold.

9. The detector as claimed in claim 7, characterized in that the sum of the thickness of the electrically and thermally insulating layer and of half of the thickness of the thermosensitive absorbing element is almost equal to a quarter of the mean wavelength of the spectral sensitivity range.

10. An optical architecture comprising a detector according to claim 1, characterized in that the optical architecture also comprises entrance optics collecting the incident radiation to be detected and having a diameter $\Phi$ and a focal length f, the viewing angle of the detector is limited to a value $\theta$ which is almost equal to 2 arctan ($\Phi/2f$).

* * * * *